United States Patent Office 3,036,980
Patented May 29, 1962

3,036,980
RUBBER COMPOSITION CONTAINING ZEOLITIC MOLECULAR SIEVE AND PROCESS FOR CURING
Milton L. Dunham, Jr., and Francis M. O'Connor, Kenmore, N.Y., assignors to Union Carbide Corporation, a corporation of New York
No Drawing. Filed Dec. 31, 1956, Ser. No. 631,397
35 Claims. (Cl. 260—31.4)

This invention relates to a process for curing organic resins and elastomers and the novel agent used in such processes. The agent of the invention is a latent curing agent which includes a volatile curing compound that is released by heating or otherwise during a curing reaction. The curing agent of the invention may be blended with a curable compound and the blended materials stored without substantially affecting the properties of the curable compound or the effectiveness of the curing compound. The curing agent of the invention can be used with natural rubber and other curable materials, for example natural and synthetic organic resins. Other embodiments of the agent of the invention may be employed as accelerators in some reactions, for example in the curing of natural rubber.

The nature of the advantages that are to be obtained with the agent of the invention can be seen from its use in the curing of rubber.

In conventional practice curable materials such as natural and synthetic rubber are combined with curing agents and heated to effect a curing reaction between the agent and the material. Different combinations of curing agents and curable materials differ considerably in their rates of reaction. Some reactions occur so rapidly as to make proper blending of the curing agent and the curable material a problem. The volatility of some curing agents is such that substantial amounts of the agent are lost during compounding of the agent and curable material and before the curing reaction is initiated. Volatile curing agents which escape from the curable material prior to curing may present problems due to their explosive, inflammable, or toxic nature. Many curing agents including some of the less volatile ones also tend to escape from the curable material during storage.

It is an object of the present invention to provide a curing agent which may be retained in a curable compound prior to curing without substantially deleteriously affecting the properties of the curable compound.

Another object is to provide a curing agent which permits the efficient use of volatile or highly reactive curing compounds in curing natural and synthetic elastomers and resins, for example, natural rubber.

Another object is to provide a curing agent which can be blended with a curable compound to form a mixture the properties of which do not deteriorate during storage.

The objects of the invention are accomplished by adsorbing the curing compound in a zeolitic molecular sieve thereby providing a carrier for the curing compound. The resulting agent may be blended with other materials, as for example with a curable compound, with the beneficial results which will appear from the examples and tests described below.

Zeolitic molecular sieves, both natural and synthetic, are metal-aluminum-silicates. The crystalline structure of these materials is such that a relatively large sorption area is present inside each crystal. Access to this area is by way of openings or pores in the crystal. Molecules are selectively adsorbed by molecular sieves on the basis of size and polarity among other things.

To facilitates an understanding of the terms used in the examples and claims appearing below, some of the synthetic zeolitic molecular sieves used in making the curing agent of the invention will be described. For convenience one of the synthetic molecular sieves used has been designated "zeolite X" and is described, together with a process for making it, in detail in United States patent application Serial No. 400,389, filed December 24, 1953, now U.S. Patent No. 2,882,244, issued April 14, 1959.

The general formula for zeolite X, expressed in terms of mol fractions of oxides is as follows:

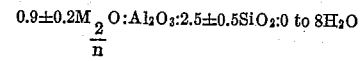

In the formula "M" represents a metal and "$n$" its valence. The zeolite is activated or made capable of adsorbing certain molecules by the removal of water from the crystal as by heating. Thus the actual number of mols of water present in the crystal will depend upon the degree of dehydration or activation of the crystal.

The metal represented in the formula above by the letter "M" can be changed by conventional ion exchange techniques. The sodium form of the zeolite, designated sodium zeolite X, is the most convenient to manufacture. For this reason the other forms of zeolite X are usually obtained by the modification of sodium zeolite X.

A typical formula for sodium zeolite X is:

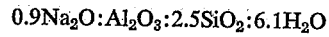

After activation by heating at least some of the water is removed from the zeolite X and it is then ready for use in preparing the curing agent of the invention.

The major lines in the X-ray diffraction pattern of sodium zeolite X are set forth in Table A below:

TABLE A

| $d$ Value of reflection in A. | 100 $I$, $I_0$ |
| --- | --- |
| 14.42±0.2 | 100 |
| 8.82±0.1 | 18 |
| 4.41±0.05 | 9 |
| 3.80±0.05 | 21 |
| 3.33±0.05 | 18 |
| 2.88±0.50 | 19 |
| 2.79±0.05 | 8 |
| 2.66±0.05 | 8 |

In obtaining the X-ray diffraction powder patterns, standard techniques were employed. The radiation was the K-alpha doublet of copper, and a Geiger counter spectrometer with a strip chart pen recorder was used. The peak heights, $I$, and the positions as a function of $2\theta$, where $\theta$ is the Bragg angle, were read from the spectrometer chart. From these, the relative intensities $$\frac{100\,I}{I_0}$$

where $I_0$ is the intensity of the strongest line or peak, and $d$(obs), the interplanar spacing in A., corresponding to the recorded lines were calculated. The X-ray patterns indicate a cubic unit cell of dimensions between 24.5 A. and 25.5 A.

To make sodium zeolite X reactants are mixed in aqueous solution and held at about 100° C. until the crystals of zeolite X are formed. Preferably the reactants should be such that in the solution the following ratios prevail:

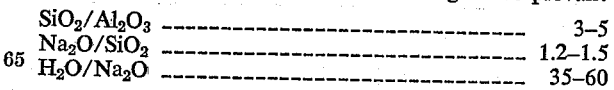

The manner in which zeolite X might be obtained is illustrated by the following: 10 grams of NaAlO₂, 32 grams of an aqueous solution containing by weight about 20% Na₂O and 32% SiO₂, 5.5 grams NaOH and 135 cc. H₂O were mixed and held in an autoclave for 47 hours at about 100° C. Crystalline zeolite X was recovered by filtering the reacted materials and washing with water until the pH of the effluent wash water is between 9 and 12. The crystals are dried after which they are ready for use in making the curing agent of the invention.

Another synthetic zeolitic molecular sieve which has successfully been used in preparing a curing agent according to the invention has been designated "zeolite A" and is described in detail together with processes for its preparation in United States patent application Serial No. 400,388, filed December 24, 1953, now U.S. Patent No. 2,882,243, issued April 14, 1959.

The general formula for zeolite A, expressed in terms of mol fractions of oxides is as follows:

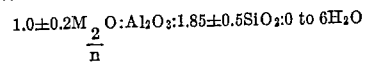

In the formula "M" represents a metal, hydrogen, or ammonium, "$n$" the valence of "M." The amount of water present in zeolite A will of course depend on the degree of dehydration of the crystals.

As in the case of zeolite X and other zeolites, the element or group designated by "M" in the formula can be changed by conventional ion exchange techniques. Sodium zeolite A is the most convenient form to prepare and other forms are usually obtained from it by an exchange of ions in aqueous solutions. A typical formula for sodium zeolite A is $$0.99Na_2O:1.0Al_2O_3:1.85SiO_2:5.1H_2O$$

The removal of at least part of the water, as by heating, would be sufficient to prepare the sodium zeolite A for use in making the curing agent of the invention.

Using the techniques by which the X-ray diffraction data for sodium zeolite X was obtained, similar data for sodium zeolite A was obtained and is recorded in Table B.

TABLE B

| $d$ Value of reflection in A. | 100 I, I$_0$ |
|---|---|
| 12.2 ±0.2 | 100 |
| 8.6 ±0.2 | 69 |
| 7.05±0.15 | 35 |
| 4.07±0.08 | 36 |
| 3.68±0.07 | 53 |
| 3.38±0.06 | 16 |
| 3.26±0.05 | 47 |
| 2.96±0.05 | 55 |
| 2.73±0.05 | 12 |
| 2.60±0.05 | 22 |

To make sodium zeolite A reactants are mixed in aqueous solution and held at about 100° C. until crystals of sodium zeolite A are formed. The reactants should be such that in the solution the following ratios prevail:

$SiO_2/Al_2O_3$ ---------------------------------- 1.3–2.5
$Na_2O/SiO_2$ ---------------------------------- 0.8–3.0
$H_2O/Na_2O$ ---------------------------------- 35–200

An example of the manner in which zeolite A may be prepared is as follows: 80 grams of $NaAlO_2$, 126 grams of an aqueous solution of sodium silicate containing about 7.5% by weight $Na_2O$ and 25.8% by weight $SiO_2$, and 320 cubic centimeters of water were placed in an autoclave. In the autoclave the following ratios prevailed:

$SiO_2/Al_2O_3$ ---------------------------------- 1.2
$Na_2O/SiO_2$ ---------------------------------- 1.2
$H_2O/Na_2O$ ---------------------------------- 36

The contents of the autoclave were held at about 100° C. for about 12 hours. Crystalline zeolite A was recovered by filtration and washed with distilled water until the effluent wash water had a pH of between 9 and 12. After drying and dehydration the crystals are ready for use in making the curing agent of the invention.

Certain peroxide compounds have given excellent results in the curing of both natural and synthetic organic resins. One such compound is di-tertiary-butyl peroxide. The volatility of the peroxide curing compound has made its use in the curing of the elastomers difficult. Storage in containers open to the atmosphere of curable materials containing the peroxide for more than short periods results in the loss of a considerable amount of the peroxide. Vapors present in the atmosphere near resins containing the peroxide compound also present hazards of fire or toxicity.

Di-tertiary-butyl peroxide can be adsorbed by zeolite X. In the adsorbed state the loss of the peroxide during handling is minimized. The peroxide can be distributed uniformly through the resin to be cured. Upon being heated to a curing temperature, zeolite X releases the peroxide curing compound and a cure is effected. Examples I to III illustrate the preparation of a curing agent within the scope of the invention.

*Example I*

A beaker containing 16.93 grams of activated zeolite X in the form of a finely divided powder was placed in a desiccator containing di-tertiary-butyl peroxide and the desiccator was closed. After standing overnight (about 18 hours) the zeolite X was found to have adsorbed 1.31 grams of di-tertiary-butyl peroxide.

*Example II*

With equipment and in the manner described in Example I, 20.03 grams of activated zeolite X were held for about three days. As a result 4.03 grams of di-tertiary-butyl peroxide were adsorbed by the zeolite.

*Example III*

1349 grams of compacted activated zeolite X were placed in a glass column which was 60 inches long and had a 2-inch inside diameter. 184 grams of di-tertiary-butyl peroxide were placed in a saturator and dry nitrogen was passed through the peroxide. The peroxide-saturated nitrogen was then passed through the packed column. This treatment was continued for about one week, with additions of di-tertiary-butyl peroxide to the saturator when needed. After this treatment, the zeolite had gained 240 grams in weight. This is approximately equivalent to 17.8 grams of di-tertiary-butyl peroxide per 100 grams of activated zeolite X.

Samples of organic elastomers which can be cured with di-tertiary-butyl peroxide were tested. The samples were prepared by blending 100 parts of the elastomers with 50 parts of a carbon black filler. To the blended materials di-tertiary-butyl peroxide either alone or adsorbed on zeolite X was added on a rubber compounding mill. The materials were cured immediately and the results are set forth in Table C.

TABLE C

| Elastomer | Parts DTBP[1] per 100 parts polymer | Remarks | Tensile (p.s.i.) | Elongation (percent) | Set at break (percent) | Shore A hardness |
|---|---|---|---|---|---|---|
| A | 3.0 | Catalyst adsorbed on Zeolite X | 1,925 | 525 | 30 | 70 |
| A | 3.0 | | 391 | 875 | 190 | 60 |
| B | 0.5 | Catalyst adsorbed Zeolite X | 2,450 | 280 | Nil | 70 |
| B | 0.5 | | 276 | 680 | 200 | 57 |
| C | 1. | Catalyst adsorbed on Zeolite X | 2,360 | 400 | 3 | 52 |
| C | 3.0 | | 1,640 | 370 | Nil | 46 |

[1] DTBP–di-tertiary-butyl peroxide.

In Table C, "A" designates a copolymer of butadiene and acrylonitrile (containing about 25% acrylonitrile), "B" designates a copolymer of butadiene and styrene (containing 19% to 21% by weight styrene), and "C" designates natural rubber.

With the materials tested and reported in Table C a well cured sample should have a tensile strength of about 2000 p.s.i. or more. An examination of the data presented in the Table reveals that only those samples in which the peroxide catalyst was adsorbed on a molecular sieve in accordance with the teachings of the invention had the desired minimum tensile strength.

The "set at break" is the increase in length of a cross section which has been stretched and broken and is a measure of the tightness of the cure. The lowness of the figure in the "set at break" column is indicative of a good cure. In this respect it can be seen that the materials cured using the latent curing agent of the invention had superior properties.

The elongation of a test specimen is not by itself indicative of a well cured material but in general a relatively high elongation in conjunction with the high tensile strength and low "set at break" is desirable. The specimens cured with the latent curing agent of the invention have the desired combination of properties.

The hardness measurement is not an accurate determination of the extent of cure. However, a very low hardness, that is one below about 45 on a carbon black filled rubber, generally indicates a low state of cure. In this respect the samples in which the curing compound was adsorbed on a molecular sieve were satisfactory.

To determine the effectiveness of the latent curing agent of the invention in curing an elastomer after storage the tests described in Example IV were made.

EXAMPLE IV

Sheets of a number of carbon black filled elastomers were prepared. These sheets consisted in each instance of 100 parts elastomer and 50 parts carbon black. The sheets were approximately 100 mils thick and were hung in a ventilated hood with both sides of the sheets exposed to the atmosphere at an average temperature of about 78° F. For comparison, sheets of the material were cured immediately after compounding and tested. The curing compound used in all tests was di-tertiary-butyl peroxide. Di-tertiary-butyl peroxide was present in an amount equal to three parts per 100 parts of elastomer. The samples were cured by holding them at 310° F. for 45 minutes. Where indicated in Table D, zeolite X was used as a carrier for the curing compound in accordance with the teachings of the invention.

TABLE D

| Elastomer | Zeolite X catalyst carrier | Aging time (days) | Physical properties | | | |
|---|---|---|---|---|---|---|
| | | | Tensile (p.s.i.) | Elongation (Percent) | Set at break (Percent) | Shore A hardness |
| D | Yes | 0 | 562 | 405 | 50 | 63 |
| D | Yes | 7 | 830 | 340 | 15 | 70 |
| D | No | 0 | 557 | 695 | 100 | 57 |
| D | No | 7 | 359 | 910 | 300 | 60 |
| B | Yes | 0 | 2,070 | 90 | Nil | 85 |
| B | Yes | 7 | 1,880 | 205 | Nil | 70 |
| B | No | 0 | 1,920 | 190 | Nil | 69 |
| B | No | 7 | 870 | 630 | 90 | 52 |
| C | Yes | 0 | 2,000 | 300 | Nil | 59 |
| C | Yes | 7 | 2,025 | 270 | Nil | 54 |
| C | No | 0 | 1,640 | 370 | Nil | 46 |
| C | No | 7 | (¹) | (¹) | (¹) | (¹) |
| A | Yes | 0 | 1,925 | 525 | 30 | 70 |
| A | Yes | 13 | 2,700 | 270 | Nil | 74 |
| A | No | 0 | 391 | 875 | 190 | 60 |

¹ No cure obtained.

In the table, "A" designates a copolymer of butadiene and acrylonitrile (containing about 25% acrylonitrile), "B" designates a copolymer of butadiene and styrene (containing 19% to 21% by weight styrene), "C" designates natural rubber, and "D" designates a copolymer of butadiene and an acrylic ester.

From the data reported in Table D it can be seen that the cure resulting with the peroxide catalyst adsorbed on zeolite X is approximately the same whether the curing takes place immediately after compounding or after storage under the indicated conditions for 7 days. Also where natural rubber containing di-tertiary-butyl peroxide that was not adsorbed on a molecular sieve was stored for 7 days, no cure was obtained.

The tensile strengths of the samples of elastomer D reported in the table are not too high. The peroxide compound is not the best curing agent for this elastomer but the principle of the retention of the curing powers of the latent curing agent of the invention is demonstrated by the data relating to this elastomer. Better physical properties were obtained with the elastomer D when diethylene triamine was used as the curing compound. Samples were prepared in which three parts of the amine compound per 100 parts of the resin were employed. Aging of the 100-mil sheets was conducted as described above in connection with the test reported in Table D. The curing compound was adsorbed in some instances in zeolite X and in others was added in the absence of a carrier. The results of the tests are reported in Table E.

TABLE E

| Elastomer | Adsorbent used | Aging Time (days) | Physical properties | | | |
|---|---|---|---|---|---|---|
| | | | Tensile (p.s.i.) | Elongation (percent) | Set at break (percent) | Shore A hardness |
| D | Sodium X | 0 | 1,500 | 260 | 5 | 75 |
| D | do | 7 | 1,270 | 115 | Nil | 82 |
| D | None | 0 | 1,630 | 100 | Nil | 80 |
| D | do | 7 | 1,490 | 110 | Nil | 78 |

In Table E it can be seen that the effectiveness of the curing agent was retained during storage. The contrast with these materials was not as great as in the case of some other elastomer and curing compound combinations. However, diethylene triamine is difficult to handle being injurious to the skin and eyes. When the amine was added to the resin in the absence of zeolite X considerable fuming was observed. No fuming was noted and the amine odor was substantially decreased during compounding when the diethylene triamine was adsorbed on zeolite X.

The use of other amines in the preparation of the latent curing agent of the invention is illustrated in Example V. The use of the curing agent containing the amine curing compound is demonstrated in Example VI.

*Example V*

Two beakers, one containing 92.3 grams of zeolite X and the other containing 63.5 grams of piperidine, were placed in a desiccator. After evacuation the desiccator containing the beakers was allowed to stand for 24 hours. The zeolite X adsorbed 23.1 grams of piperidine or about 20% by weight.

*Example VI*

To test the effectiveness of the curing agent prepared in Example V with a polysiloxane-epoxy casting resin the following materials were mixed: 23.1 grams (0.07 OH equivalent) of a resorcylic-endblocked polysiloxane (this polysiloxane is the reaction product of 1 mol of resorcinol and 1 ethoxy equivalent of a partially condensed phenylmethyl polysiloxane of the thermosetting type containing 18.8% by weight of total resin of ethoxy groups bonded to silicon atoms), 12.9 grams (0.076 equivalent) of a low molecular weight epoxy resin, and 2.9 grams of zeolite X containing piperidine. The piperidine-containing zeolite X was obtained by blending 10% by weight of the treated zeolite X from Example V with 90% by weight of untreated dry zeolite X. These materials after mixing were cured for five hours at 150° C. The cured material was clear except for the bottom portion which contained the zeolite X. For purposes of comparison, the same resin was subjected to the same curing treatment with the piperidine only and with zeolite X only. The results of the tests were reported in Table F.

TABLE F

| Resin contained | Cure time at 150° C. | | | |
|---|---|---|---|---|
| | 15 min. | 3 hrs. | 4.5 hrs. | 16 hrs. |
| 0.2% piperidine | Gel | | | |
| 0.2% piperidine+Zeolite X | Liquid | Soft gel | Gel | |
| 2.9 g. Zeolite X | do | Liquid | Liquid | Soft gel. |

From Table F it can be seen that the latent curing agent of the invention, as illustrated by the piperidine-containing zeolite X, prevents the premature gelation of the resin thus increasing its storage time.

The advantages of using the latent curing agent of the invention in connection with the curing of siloxane resins with diethanolamine were determined in experiments reported in Examples VII and VIII.

*Example VII*

To 5 grams of zeolite X, 0.5 gram of diethanolamine was added. The excess capacity of the zeolite over that required to adsorb the diethanolamine was filled with ethanol.

*Example VIII*

A polysiloxane resin prepared by the hydrolysis and condensation of methyl trichlorosilane, methyl dichlorosilane, and phenyl trichlorosilane was selected for testing. The resin was characterized by an organic-groups to silicon-atoms ratio of 1.525 and a phenyl-groups to methyl-groups ratio of 0.35. Samples of the resin were made up which contained, respectively, no curing agent, 0.2% diethanolamine, 0.2% diethanolamine adsorbed by zeolite X, and 0.4% diethanolamine adsorbed by zeolite X. The samples were held at room temperature for 11 days and then some of them, as reported in tests 6, 7 and 8 in Table G were subjected to higher temperatures. The viscosities of the samples were determined at intervals. The data from the tests are reported in Table G.

TABLE G

| Test No. | Holding time | Holding temp., °C. | Viscosity at room temperature (centipoises) | | | |
|---|---|---|---|---|---|---|
| | | | No curing agent | 0.2% DEA[1] | 0.2% DEA[1] in Zeolite X | 0.4% DEA[1] in Zeolite X |
| 1 | 0 | Room | 156 | 156 | 156 | 156 |
| 2 | 5.5 hrs | Room | 156 | 252 | 156 | 174 |
| 3 | 7 hrs | Room | 156 | 290 | 156 | 178 |
| 4 | 31 hrs | Room | 156 | (²) | 174 | 220 |
| 5 | 11 days | Room | 156 | | 176 | 274 |
| 6 | 11 days, 1 day | Room 70 | | 156 | 186 | 276 |
| 7 | 11 days, 1 day | Room 100 | | 152 | 185 | 276 |
| 8 | 11 days, 1 day | Room 150 | | 230 | (²) | (³) |

[1] Diethanolamine.  [2] Soft gel.  [3] Solid gel.

At 200° C. samples of the resin formed a gel as follows: no catalyst—longer than ten minutes; 0.2% diethanolamine—one minute; 0.2% diethanolamine in zeolite X—five minutes; and 0.4% diethanolamine in zeolite X—five minutes.

From Table G it appears that the use of the curing agent which is adsorbed by the molecular sieve according to the invention considerably prolongs the shelf life of a resin and at the same time provides an effective curing reaction at curing temperatures.

Another family of resins with which the latent curing agent of the invention has been successfully employed can be designated as the unsaturated polyesters. These materials consist of a polyester containing some unsaturated groupings, generally maleic ester groups, in solution in styrene monomer. Methyl ethyl ketone peroxide is known to be an effective curing agent with these materials, causing a cross linking between the styrene and the unsaturated parts of the polyester. The speed with which the system gels has caused considerable difficulty in its handling. For this reason a curing agent which is relatively unreactive at room temperature and effective at elevated temperatures is desirable. By adsorbing methyl ethyl ketone peroxide on zeolite X a satisfactory curing agent is obtained. The preparation of such curing agent and the test of its effectiveness is reported in Example IX.

*Example IX*

A solution of methyl ethyl ketone peroxide in n-heptane was mixed with crystals of zeolite X. The peroxide was adsorbed in an amount equal to 15.8 percent by weight of the molecular sieve. Samples of an unsaturated polyester resin were prepared by the addition to one portion of the resin of 1 percent by weight of methyl ethyl ketone peroxide and to another portion of 1 percent by weight of methyl ethyl ketone peroxide adsorbed by zeolite X. Viscosity measurements of the treated resin were made at intervals and are reported in Table H.

TABLE H

| Time (hrs.) | Viscosity of resin at room temperature in centipoises | |
|---|---|---|
| | 1% methyl ethyl ketone peroxide | 1% methyl ethyl ketone peroxide on Zeolite X |
| 0 | 1,905 [1] | 3,200 |
| 2 | 2,095 | 3,800 |
| 4 | 30,000—some gelation | 4,100 |
| 5 | >100,000—rigid gel | 4,200 |
| 24 | | 4,500 |
| 48 | | 4,550 |
| 120 | | 5,300 |
| 145 | | [2] 6,200 |

[1] Sample heated at 130° C. Hard resin obtained in 30 min.
[2] Sample heated at 130° C. Hard resin obtained in 60 min.

The preparation of curing agents using zeolite A is illustrated in Examples X and XI and the use of these agents is described in Example XII.

*Example X*

Two beakers, one containing paraformaldehyde and the other containing 32.0 grams of activated zeolite A were placed in a vacuum desiccator. After evacuation the desiccator was placed in an oven at 70° C. for 24 hours. The zeolite adsorbed 10.6 grams of formaldehyde or 24.9% by weight.

*Example XI*

29.5 grams of powdered zeolite A were placed in a 1-inch diameter glass tube about 18 inches long. Anhydrous ammonia was passed over the powder for 3 hours. The zeolite adsorbed 3.4 grams of ammonia or 10.3% by weight.

*Example XII*

Two phenolic resins were cured using the materials prepared in Examples X and XI. For comparison samples of the same resins were cured with hexamethylene tetramine, the conventional curing agent for these resins. The amount of ammonia and formaldehyde added to the resin was equivalent to the amount of each formed by the decomposition of 10% hexamethylene tetramine. In Table I the results of these tests are given. Ten grams of resin were cured in each test.

TABLE I

| Curing system | Weight curing agent (g.) | Cure time at 165° C. (min.) | Remarks |
|---|---|---|---|
| Hexamethylene tetramine | 1 | 5 | Resin foamed considerably. |
| 10.3% NH₃ in zeolite A | 2.5 | ¹5 | Very little foaming. |
| 24.9% CH₂O in zeolite A | 2.5 | | |
| Hexamethylene Tetramine | 1 | 5 | Considerable foaming. |
| 10.3% NH₃ on sodium A | 2.5 | ²10 | Very little foaming. |
| 24.9% CH₂O on sodium A | 2.5 | | |

¹ No cure after 5 minutes at 150° C.
² No cure after 5 minutes at 150° C., partial cure after 5 minutes at 165° C.

The latent curing agent of the invention makes possible the curing of neoprene rubber, a polymer of chloroprene, with di-tertiary-butyl peroxide as shown in Example XIII.

*Example XIII*

100 parts of neoprene, 30 parts of a reinforcing filler and 14 parts of zeolite X containing 14.3 weight-percent di-tertiary-butyl peroxide (equivalent to 2 parts of peroxide) were blended together. The resulting material was heated in a rubber mold at 310° F. for 30 minutes. The cured product had a tensile strength of 1380 p.s.i., an elongation of 600%, a set at break of 15%, and a Shore A hardness of 62.

The behavior of an epoxy resin with the curing agent of the invention is shown in Example XIV.

*Example XIV*

About 75 grams of an epoxy resin containing a phenolic resin as the hardener, and 2.3 grams of activated zeolite X powder containing 16.7 weight-percent adsorbed piperidine were blended. A sample was placed in an aluminum dish. This sample was heated at 140–150° C. and a completly cured resin was obtained in 20 minutes, a relatively short time for curing this system. The remainder of the mixed materials were kept in a jar at room temperature and checked periodically. Table J shows the results of observations which were made of the stored materials.

TABLE J

Time elapsed (days):                          Observations
7 ———————————— No change.
14 ———————————— No change.
21 ———————————— No change.
28 ———————————— No change.
35 ———————————— Resin slightly harder.
42 ———————————— Surface of resin harder, still flows.
49 ———————————— Whole resin harder, still flows slowly.
56 ———————————— Difficult to puncture surface.

The results reported in Table J show that the epoxy resin containing piperidine in zeolite X can be stored for a considerable period of time without serious deterioration.

Amines are known to be good hardeners (curing agents) for epoxy resins. Ammonia has long been considered as a possible hardener, but it is difficult to incorporate in a resin. Example XV shows that ammonia is a good hardener for an epoxy resin and further, shows that it may be incorporated in an epoxy resin according to the teachings of the invention.

*Example XV*

An epoxy resin and thirty grams of zeolite X containing 16.3 weight-percent ammonia were blended and placed in a jar. A sample of these materials was placed in a 2-inch aluminum dish which was heated in an oven. A hard resin was obtained after heating for 1 hour at 100° C. and 30 additional minutes at 130° C. The remainder of the materials was stored in the closed jar at room temperature and the viscosity measured on a Brookfield viscometer periodically. These data are shown in Table K.

TABLE K

Time (days):                          Viscosity (centipoises)
0 ———————————— 8,400.
1 ———————————— 34,000.
4 ———————————— 100,000, stringy polymer.
5 ———————————— Hard resin.

The reaction that transforms a rubber formulation to a vulcanized product is primarily a cross linking process. The ordinary ground sulfur used for rubber compounding is considered chemically to be an aggregate of eight sulfur atoms existing as a ring-shaped structure. In order to serve as a vulcanizing agent, it must be converted from the relatively inert ring structure to a more active form—sulfur radicals. Organic accelerators are commonly used in rubber formulations and it is their function to serve as a catalyst for the formation of sulfur radicals. The use of very active accelerators is limited by the fact that rubber compounds are mixed at relatively high temperatures and prevulcanization during compounding ("scorching") may occur.

According to the invention these accelerators can be employed in the curing of organic rubbers. Table L shows that "butyl-8" which is an extremely active accelerator having the composition 21% 2-mercaptobenzothiazole, 34% dibutyl ammonium thiocarbamate and 45% Cellosolve cannot be added safely to rubber compounds. Adsorption of the accelerator with zeolite X improved the performance of the accelerator considerably. The rubber formulation with which the data in Table L was obtained was 100 parts of a copolymer of butadiene and 19% to 21% styrene, 50 parts of carbon black, 5 parts of zinc oxide and 2 parts sulfur.

TABLE L

| Adsorbent used | Weight, percent butyl-8 on adsorbent | Parts butyl-8 per 100 parts polymer | Cure temp. (° F.) | Cure time (min.) | Physical properties | | | |
|---|---|---|---|---|---|---|---|---|
| | | | | | Tensile (p.s.i.) | Elongation (percent) | Set at break (percent) | Shore A hardness |
| None | | 0 | 310 | 10 | (¹) | (¹) | (¹) | (¹) |
| Do | | 0 | 340 | 10 | 315 | 800 | 250 | 60 |
| Do | | 0 | 380 | 5 | 2,700 | 390 | 15 | 67 |
| Do | | 3.0 | 340 | 20 | 1,475 | 560 | 50 | 64 |
| Do | | ²3.0 | 310 | 10 | 2,700 | 260 | Nil | 73 |
| Do | | 3.0 | 250 | 15 | 3,315 | 350 | Nil | 74 |
| Zeolite X | 25.8 | 3.0 | 310 | 10 | (¹) | (¹) | (¹) | (¹) |
| Do | 25.8 | 3.0 | 340 | 10 | 940 | 600 | 70 | 65 |
| Do | 25.8 | 3.0 | 340 | 20 | 2,370 | 510 | 15 | 70 |

¹ No cure obtained.      ² Scorched in 7 min. at 205° F. on roll mill.

Most accelerators which give rapid curing rubber formulations are generally too active during processing also and, hence, are not safe to use. Those which have good non-scorching properties result in relatively slow curing compounds. This has led to the use of combinations of accelerators—a "primary" which is the actual catalyst for sulfur and a "secondary" (commonly called "activator") which increases the activity of the primary accelerator. The ideal activator is one which has little or no effect on the primary accelerator during processing but has a very pronounced effect at the curing temperature.

In Table M the effect of a number of amines on the curing of a GRS rubber (a copolymer of butadiene and 19%–21% styrene) formulation are reported. The data in the table were obtained by blending together 100 parts of GRS, 50 parts of carbon black, 5 parts of zinc oxide, 2 parts of sulfur, 1.5 parts of 2-mercaptobenzothiazole (MBT) and the specified amounts of the amine. In some instances, as indicated in the table, the amine was adsorbed on zeolite X and in other instances it was added directly to the rubber formulation. The samples were cured at 305° F. for 5 minutes.

TABLE M

| Zeolite X used | Amine used | Weight percent amine on Zeolite X | Parts amine 100 parts GRS | Aging time (days) | Physical properties of cured rubber | | | |
|---|---|---|---|---|---|---|---|---|
| | | | | | Tensile (p.s.i.) | Elongation (percent) | Set at break (percent) | Shore A hardness |
| No | None | | 0 | 0 | 50 | 500 | 300 | 55 |
| No | Diethylamine | | 0.2 | 0 | 1,955 | 600 | 25 | 63 |
| No | do | | 0.2 | 9 | 970 | 660 | 70 | 60 |
| No | do | | 0.4 | 0 | 2,740 | 470 | 10 | 67 |
| No | do | | 0.2 | 0 | 2,970 | 410 | 5 | 68 |
| Yes | do | 13.1 | 0.2 | 0 | 2,740 | 480 | 10 | 67 |
| Yes | do | 13.1 | 0.2 | 25 | 2,805 | 410 | 5 | 67 |
| Yes | do | 13.1 | 0.2 | 0 | 2,805 | 480 | 10 | 68 |
| Yes | Propylene diamine | 17.4 | 0.2 | 25 | 2,945 | 450 | 10 | 67 |
| Yes | do | 17.4 | 0.2 | 0 | 2,795 | 370 | 5 | 69 |
| No | Piperidine | | 0.2 | 0 | 2,935 | 450 | 10 | 68 |
| Yes | do | 16.7 | 0.2 | 0 | 3,110 | 460 | 10 | 68 |
| Yes | do | 16.7 | 0.2 | 21 | 3,015 | 360 | 5 | 69 |
| Yes | do | 16.7 | 0.08 | 0 | 2,930 | 425 | 10 | 69 |
| Yes | do | 16.7 | 0.08 | 18 | 2,665 | 520 | 15 | 64 |
| No | Di-n-butylamine | | 0.2 | 0 | 2,680 | 480 | 20 | 65 |
| No | do | | 0.2 | 9 | 2,570 | 520 | 20 | 65 |
| No | do | | 0.2 | 0 | 2,430 | 560 | 15 | 65 |
| Yes | do | 13.1 | 0.2 | 0 | 2,625 | 580 | 15 | 66 |
| Yes | do | 13.1 | 0.2 | 0 | 2,650 | 515 | 15 | 66 |
| Yes | do | 13.1 | 0.2 | 25 | 2,925 | 500 | 10 | 67 |
| Yes | Aniline | 14.6 | 0.15 | 0 | 129 | 710 | 500 | 56 |
| Yes[1] | do | 14.6 | 0.30 | 0 | 2,460 | 570 | 25 | 60 |

[1] Cured 1 minute at 400°F.

Amines are known to be good activators for thiazole type primary accelerators. Several have been tried with good results including diethylamine, propylene diamine, piperidine and di-n-butylamine. The use of these amines has been restricted because of their volatility, reactivity and toxicity. According to the present invention these materials were satisfactorily employed in the curing of organic rubber compounds.

Also tested were samples of natural rubber, a nitrile rubber (GRN) formulation and a butyl rubber formulation. The results from the tests of these samples is reported in Table N. In each instance 100 parts of a polymer were blended with 50 parts of carbon black, 5 parts of zinc oxide, 2 parts of sulfur, 1.5 parts of 2-mercaptobenzothiazole (MBT), and the indicated quantities of the amine. All samples were cured at 305° F. for 5 minutes.

TABLE N

Natural Rubber Formulations

| Zeolite X used | Amine used | Weight percent amine on Zeolite X | Parts amine 100 parts GRS | Aging time (days) | Physical properties of cured rubber | | | |
|---|---|---|---|---|---|---|---|---|
| | | | | | Tensile (p.s.i.) | Elongation (percent) | Set at break (percent) | Shore A hardness |
| No | None | | 0 | 0 | 1,325 | 450 | 30 | 48 |
| Yes | Piperidine | 16.7 | 0.08 | 0 | 2,710 | 425 | 25 | 60 |
| Yes | do | 16.7 | 0.08 | 18 | 2,630 | 435 | 25 | 59 |
| Yes | do | 16.7 | 0.2 | 0 | 3,175 | 420 | 20 | 65 |
| Yes | do | 16.7 | 0.2 | 16 | 3,195 | 450 | 25 | 64 |

Nitrile Rubber Formulations

| No | None | | 0 | 0 | 1,000 | 1,060 | 150 | 63 |
|---|---|---|---|---|---|---|---|---|
| Yes | Piperidine | 16.7 | 0.08 | 0 | 3,180 | 605 | 25 | 67 |
| Yes | do | 16.7 | 0.08 | 18 | 3,465 | 560 | 25 | 67 |

Butyl Rubber Formulations

| No | None | | 0 | 0 | ([1]) 890 | ([1]) 1,100 | ([1]) 150 | 52 |
|---|---|---|---|---|---|---|---|---|
| Yes | Piperidine | 16.7 | 0.08 | 0 | 700 | 1,100 | ([2]) | 51 |
| Yes | do | 16.7 | 0.08 | 18 | | | 100 | 53 |
| Yes | do | 16.7 | 0.2 | 0 | 1,120 | 1,100 | ([2]) | 53 |
| Yes | do | 16.7 | 0.2 | 16 | 1,000 | 1,100 | ([2]) | 52 |

[1] No cure obtained.   [2] Samples did not break.

From the data in Tables M and N, it can be seen that with the more volatile amines such as diethyl amine satisfactory cures cannot be obtained without the use of zeolite X unless relatively large amounts of the amine are employed. With the other amines tested, satisfactory cures were possible in most instances immediately after compounding when no zeolite was employed. However, the handling of these materials was rather hazardous. The use of zeolite X as a carrier for these amines made the handling of these materials safe and permitted prolonged storage of the compounds without appreciable effects on their curing characteristics.

The effect of using zeolite X as a carrier for di-n-butylamine in GRS rubber is shown in Table O. The use of the carrier gives slightly better non-scorching properties to the formulation and also results in faster cure rates. The rate of evaporation is decreased by using the adsorbent, thus keeping the concentration of the amine at a higher level. It is also much easier to handle an obnoxious material which is adsorbed in zeolite X than it is to handle the same material in concentrated form. It is also shown in this table that similar advantages are obtained when the amine and zeolite are added separately to the rubber and when the zeolite is preloaded. The rubber formulation tested was as follows: GRS 100 parts, carbon black 50 parts, zinc oxide 5.0 parts, zinc stearate 2.0 parts, antioxidant 1.0 part, sulfur 2.0 parts, and Santocure (N-cyclohexyl-2-benzothiazolesulfenamide) 0.75 part.

TABLE O

| Conc. of activator | Weight-percent loading of activator on adsorbent | Mooney scorch at 250° F. min. to 5 point rise | Cure time at 307° F. min. |
|---|---|---|---|
| 0.3 | 16.6 | 39 | 10 |
| 0.3 [1] | 16.6 | 40 | 10 |
| 0.3 | (²) | 32 | 10 |

[1] Di-n-butylamine and zeolite X powder added separately.
² No adsorbent.

In the foregoing examples the zeolites have contained the sodium cation. The utility of zeolitic molecular sieves in the curing agent of the invention is not limited to any particular cation exchanged form.

*Example XVI*

Piperidine loaded calcium zeolite X was prepared by placing 50 grams of calcium zeolite X powder and 9.5 grams of piperidine in a vacuum desiccator. After evacuation, the desiccator was sealed and placed in an oven at 70° C. for 6 hours. The powder adsorbed 8.63 grams of piperidine during this time which is equivalent to 14.7 weight-percent loading.

*Example XVII*

Piperidine loaded hydrogen zeolite X was prepared by placing 50 grams of hydrogen zeolite X powder and 9.5 grams of piperidine in a vacuum desiccator. After evacuation, the desiccator was sealed and placed in an oven at 70° C. for 6 hours. The powder adsorbed 9.22 grams of piperidine during this time which is equivalent to 15.6 weight-percent loading.

The above piperidine loaded powders were used as activators for Santocure in a GRS tire tread formulation. The recipe for the formulation was:

| | Parts |
|---|---|
| GRS polymer | 100 |
| Carbon black | 50 |
| Zinc stearate | 2.0 |
| Zinc oxide | 5.0 |
| Antioxidant | 1.0 |
| Sulfur | 2.0 |
| Santocure (accelerator) | 1.0 |
| Activator | Variable |

The above formulations were compounded on a 2-roll mill and tested. The data are compiled in Table P. An unactivated formulation had a scorch time of 40 minutes and a cure time of 19 minutes. A conventional activator gave a scorch time of 27 minutes and a cure time of 10 minutes.

TABLE P

| Form of Zeolite X | Conc. of activator (parts) | Mooney scorch at 250° F. (min. to 5 pt. rise) | Cure time at 307° F. (min.) |
|---|---|---|---|
| Calcium | 0.2 | 44 | 9 |
| Do | 0.3 | 43 | 8 |
| Hydrogen | 0.2 | 34 | 9 |
| Do | 0.3 | 36 | 9 |
| Do | 0.4 | 34 | 8 |

*Example XVIII*

Ammonium zeolite X powder was used as a carrier for piperidine in organic rubber. The amine was loaded as in the two previous examples with a loading of 7.0 weight-percent piperidine obtained. In a GRS tire tread formulation similar to those given previously, the use of 4.3 phr. (parts per 100 of rubber) of piperidine loaded ammonium zeolite X (equivalent to 0.3 phr. piperidine) gave a Mooney scorch at 250° F. of 37 minutes and a cure time at 307° F. of 9 minutes.

Still another resin which can advantageously be cured with the curing agents of the invention is the dimethacrylate ester of a glycol, for example, polyethylene glycol having a molecular weight of about 200. This resin is compatible with polyvinyl chloride, and plastisols containing these materials are, when cured, extremely hard and strong. Considerable difficulty is experienced in maintaining the plastisol in an uncured condition in the presence of a peroxide curing catalyst. As can be seen in Examples XVI and XVII the adsorption of the curing catalyst with molecular sieves before it is added to the plastisol, greatly improves the stability of the plastisol.

*Example XIX*

Test samples were prepared by blending for each sample 100 grams of a polyvinyl chloride dispersion and 60 grams of the dimethacrylate ester of polyethylene glycol (molecular weight of the glycol—about 200). To sample A 1.8 grams of di-tertiary butyl peroxide were added as a liquid. To sample B 12.2 grams of sodium zeolite X containing 14.9 percent by weight of the peroxide (equal to about 1.8 grams of the peroxide) were added. The viscosity of each sample was determined at intervals with the results reported in Table Q.

TABLE Q

| Time (days) | Viscosity in poises | |
|---|---|---|
| | Sample A | Sample B |
| Initial | 21 | 28 |
| 1 | 59 | 60 |
| 4 | 103 | 145 |
| 7 | (¹) | 209 |
| 14 | | 295 |
| 20 | | (¹) |

¹ Contained polymer.

*Example XX*

A resin was compounded using 800 grams of polyvinyl chloride dispersion, 240 grams of dioctyl phthalate and 240 grams of the dimethacrylate ester of polyethylene glycol (molecular weight of the glycol about 200). Di-tertiary butyl peroxide adsorbed on sodium zeolite X was added to 160 gram samples of the resin. The amounts of the peroxide added and the Shore A durometer hardness value of the material after curing are shown in Table R. Sample A was cured without the use of the zeolite.

TABLE R

| Sample | A | B | C | D | E | F | G |
|---|---|---|---|---|---|---|---|
| Amount of peroxide (grams) | | 0.5 | 1.0 | 1.5 | 2.0 | 2.5 | 3.0 |
| Hardness | 80 | 93 | 98 | 99 | 99 | 97 | 95 |

Samples were prepared as above and held at 70° F. for 16 hours, 8 days, and 14 days. The viscosity of each sample is reported in Table S. The letter designation of similar samples are the same in each table.

TABLE S

| Sample | Viscosity (centipoises) | | |
|---|---|---|---|
| | 16 hours | 8 days | 14 days |
| A | 33,800 | 50,800 | 48,000 |
| B | 29,000 | 48,600 | 47,000 |
| C | 33,500 | 51,400 | 55,200 |
| D | 30,700 | 48,600 | 56,400 |
| E | 29,600 | 49,000 | 53,200 |
| F | 29,500 | 50,600 | 50,000 |
| G | 30,900 | 49,200 | 49,800 |

The data in Tables R and S show that formulations containing the peroxide curing compound, cure readily and maintain about the same viscosity as uncatalyzed material.

Obviously molecular sieves other than those specifically referred to in the specification can be adapted for use in the preparation of the agents of the invention. Faujasite and chabazite are examples of natural materials which might be used in accordance with the present invention.

The "Mooney scorch" data reported herein was obtained by the ASTM test method designated D1077-55T entitled "Curing Characteristics of Vulcanizable Rubber Mixtures During Heating by the Shearing Disc Viscometer." This test method is described on pages 591–592 in a bulletin published May 1956 by the American Society for Testing Materials entitled "ASTM Standards on Rubber Products." The scorch time in this test is the time in minutes for a 5 unit rise in viscosity from the minimum value.

What is claimed is:

1. A composition of matter comprising a crystalline zeolitic molecular sieve containing in the adsorbed state a curing compound for a material selected from the group consisting of curable elastomers and curable resins.

2. A composition of matter comprising a synthetic molecular sieve selected from the group consisting of zeolite A and zeolite X containing in the adsorbed state a curing compound for curable formulations, said formulations selected from the group consisting of butadiene-acrylonitrile copolymers, butadiene-styrene copolymers, butadiene-acrylic ester copolymers, natural rubber, polysiloxane resins, polysiloxane-epoxy resins, maleic ester-styrene polyesters, phenolic resins, polymers of chloroprene, epoxy resins and polyethylene glycol-dimethacrylate ester resins.

3. A composition of matter comprising a synthetic molecular sieve selected from the group consisting of zeolite A and zeolite X containing in the adsorbed state a curing compound for curable resins, said curing compound being one which is desorbable by said molecular sieve when said molecular sieve is heated to the curing temperature of the resin to be cured.

4. A composition of matter comprising a crystalline zeolitic molecular sieve containing in the adsorbed state a volatile peroxide curing compound for curable elastomers.

5. A composition of matter comprising a crystalline zeolitic molecular sieve containing in the adsorbed state di-tertiary-butyl peroxide.

6. A composition of matter comprising zeolite X, containing in the adsorbed state di-tertiary-butyl peroxide.

7. A composition of matter for use in curing organic rubbers which comprises a crystalline zeolitic molecular sieve containing in the adsorbed state a volatile amine curing accelerator.

8. A composition of matter for use in curing organic rubbers which comprises a synthetic molecular sieve selected from the group consisting of zeolite A and zeolite X containing in the adsorbed state a volatile amine curing accelerator.

9. A composition of matter comprising a curable organic elastomer having incorporated therein a quantity of a crystalline zeolitic molecular sieve containing in the adsorbed state a curing compound.

10. A composition of matter comprising a curable organic elastomer having incorporated therein a quantity of a synthetic molecular sieve selected from the group consisting of zeolite A and zeolite X containing in the adsorbed state a curing compound for curable elastomers.

11. A composition of matter comprising a curable organic elastomer having incorporated therein a quantity of a crystalline zeolitic molecular sieve containing in the adsorbed state a peroxide curing compound.

12. A composition of matter comprising a curable organic elastomer having incorporated therein a quantity of a crystalline zeolitic molecular sieve containing in the adsorbed state di-tertiary-butyl peroxide.

13. A composition of matter comprising a curable organic elastomer having incorporated therein a quantity of zeolite X containing in the adsorbed state di-tertiary-butyl peroxide.

14. A composition of matter comprising a curable organic rubber formulation having incorporated therein a quantity of a crystalline zeolitic molecular sieve containing in the adsorbed state a curing accelerator.

15. A composition of matter comprising a curable organic rubber formulation having incorporated therein a quantity of a synthetic molecular sieve selected from the group consisting of zeolite A and zeolite X containing in the adsorbed state a curing accelerator.

16. A composition of matter comprising a curable organic rubber formulation having incorporated therein a quantity of a crystalline zeolitic molecular sieve containing in the adsorbed state an amine accelerator for increasing the rate of cure of said formulation.

17. A composition of matter comprising a curable organic rubber formulation having incorporated therein a quantity of a synthetic molecular sieve selected from the group consisting of zeolite A and zeolite X containing in the adsorbed state an amine accelerator for increasing the rate of cure of said formulation.

18. A process for curing organic rubbers which process comprises providing a quantity of an organic rubber formulation having incorporated therein a quantity of a crystalline zeolitic molecular sieve containing in the adsorbed state a curing compound desorbable at the curing temperature of said rubber formulation, and desorbing said curing agent by heating said formulation and said agent to said curing temperature.

19. A process for curing an organic rubber comprising providing a quantity of said rubber having dispersed therein crystals of zeolite X, said zeolite X containing in the adsorbed state di-tertiary-butyl peroxide, heating said rubber and said zeolite X to about the curing temperature of said rubber to desorb said peroxide and reacting said rubber and said peroxide at said curing temperature to cure said rubber.

20. A process according to claim 19 wherein said rubber comprises a copolymer of butadiene and acrylonitrile 21. A process according to claim 19 wherein said rubber comprises a copolymer of butadiene and styrene.

22. A process according to claim 19 wherein said rubber comprises a polymer of chloroprene.

23. A process according to claim 19 wherein said rubber is natural rubber.

24. A process for curing organic rubbers which process comprises introducing into an organic rubber a curing agent and an accelerating agent, said accelerator being an amine adsorbed within the crystal structure of a crystalline zeolitic molecular sieve, heating said rubber, said curing agent and said accelerating agent to about the curing temperature of said rubber to desorb said accelerator from said molecular sieve and initiating at said curing temperature a curing reaction between said curing agent and said rubber.

25. A process for curing organic rubbers as claimed in claim 24 wherein said curing agent is a sulfur-containing curing agent.

26. A process for curing organic rubbers as claimed in claim 25 wherein said molecular sieve is zeolite X.

27. A process for curing organic rubbers as claimed in claim 26 wherein said accelerating agent is an amine.

28. A composition of matter comprising a crystalline zeolitic molecular sieve containing in the adsorbed state an activator for increasing the activity of cure rate accelerators for curable elastomers.

29. A composition of matter comprising a curable organic rubber formulation having incorporated therein a cure rate accelerator and a quantity of crystalline zeolitic molecular sieve containing in the adsorbed state an activator for increasing the activity of said accelerator.

30. A composition of matter comprising a curable organic rubber formulation having incorporated therein a cure rate accelerator and a quantity of a synthetic molecular sieve selected from the group consisting of zeolite A and zeolite X containing in the adsorbed state an activator for increasing the activity of said accelerator.

31. A composition of matter comprising a curable organic resin having incorporated therein a quantity of a crystalline zeolitic molecular sieve containing in the adsorbed state a curing compound.

32. A composition of matter comprising a curable organic resin having incorporated therein a quantity of a synthetic molecular sieve selected from the group consisting of zeolite A and zeolite X containing in the adsorbed state a curing compound.

33. A process for curing organic resins which process comprises providing a quantity of an organic resin formulation having incorporated therein a quantity of a crystalline zeolitic molecular sieve containing in the adsorbed state a curing agent desorbable at the curing temperature of said resin formulation, and desorbing said curing agent by heating said formulation and said agent to said curing temperature.

34. A composition of matter comprising a polyvinyl chloride plastisol containing as a curable plasticizer an acrylic diester of polyethylene glycol having incorporated therein a quantity of a crystalline zeolitic molecular sieve containing in the adsorbed state a peroxide curing compound.

35. A process for curing a polyvinyl organic resin plastisol which process comprises providing a quantity of a polyvinyl organic resin formulation having incorporated therein an acrylic diester of polyethylene glycol and a quantity of a crystalline zeolitic molecular sieve containing in the adsorbed state a peroxide curing compound desorbable at the curing temperature of said resin plastisol, and desorbing said peroxide compound by heating said resin plastisol and said peroxide containing molecular sieve to said curing temperature.

References Cited in the file of this patent

UNITED STATES PATENTS

| | | |
|---|---|---|
| 2,395,523 | Vaughan et al. | Feb. 26, 1946 |
| 2,697,699 | Cohn | Dec. 21, 1954 |
| 2,806,012 | Allen | Sept. 10, 1957 |
| 2,845,411 | Willis | July 29, 1958 |
| 2,882,243 | Milton | Apr. 14, 1959 |